US012483771B2

(12) United States Patent
Que et al.

(10) Patent No.: US 12,483,771 B2
(45) Date of Patent: Nov. 25, 2025

(54) PHOTOSENSITIVE CHIP DRIVE DEVICE AND CAMERA MODULE

(71) Applicant: NINGBO SUNNY OPOTECH CO., LTD., Ningbo (CN)

(72) Inventors: Jiayao Que, Ningbo (CN); Bojie Zhao, Ningbo (CN); Yinli Fang, Ningbo (CN); Ji Zhou, Ningbo (CN); Xueying Zheng, Ningbo (CN)

(73) Assignee: NINGBO SUNNY OPOTECH CO., LTD., Ningbo (CN)

( * ) Notice: Subject to any disclaimer, the term of this patent is extended or adjusted under 35 U.S.C. 154(b) by 70 days.

(21) Appl. No.: 18/568,304

(22) PCT Filed: May 18, 2022

(86) PCT No.: PCT/CN2022/093534
§ 371 (c)(1),
(2) Date: Dec. 8, 2023

(87) PCT Pub. No.: WO2022/257715
PCT Pub. Date: Dec. 15, 2022

(65) Prior Publication Data
US 2024/0397176 A1    Nov. 28, 2024

(30) Foreign Application Priority Data

Jun. 10, 2021   (CN) .......................... 202110645232.2

(51) Int. Cl.
*H04N 23/54* (2023.01)
*H04N 23/55* (2023.01)
(Continued)

(52) U.S. Cl.
CPC ............ *H04N 23/54* (2023.01); *H04N 23/55* (2023.01); *H04N 23/687* (2023.01); *H04N 23/57* (2023.01); *H04N 23/67* (2023.01)

(58) Field of Classification Search
CPC ........ H04N 23/54; H04N 23/55; H04N 23/57; H04N 23/67; H04N 23/687; G03B 5/00; G03B 2205/0015; G03B 2205/0038
See application file for complete search history.

(56) References Cited

U.S. PATENT DOCUMENTS

2023/0171497 A1* 6/2023 Song ..................... H04N 23/687
                                                              348/208.11
2024/0210787 A1* 6/2024 Kim ......................... G03B 5/00

FOREIGN PATENT DOCUMENTS

CN      107329348 A    11/2017
CN      109348102 A     2/2019
(Continued)

OTHER PUBLICATIONS

Machine translation of CN112770060 published May 7, 2021 (Year: 2021).*

*Primary Examiner* — Daniel M Pasiewicz
(74) *Attorney, Agent, or Firm* — Che-Yang Chen (57) ABSTRACT

Disclosed are a photosensitive chip driving device and a camera module. The photosensitive chip driving device, adapted for a photosensitive assembly, includes: a movable carrier for carrying the photosensitive assembly; a fixed base, wherein the fixed base and the movable carrier are disposed correspondingly at intervals along an optical axis direction; a diving apparatus comprising at least one group of coils and at least one group of magnets mounted on the peripheral side of the fixed base, and at least one group of coils being mounted on the peripheral side of the movable carrier; a guiding slot disposed between the movable carrier and the fixed base; a supporting apparatus movably disposed in the guiding slot; and a magnetic member mounted on the movable carrier and disposed corresponding to the magnets, (Continued)

so that a magnetic force along the optical axis direction is generated between the magnetic member and the magnets.

20 Claims, 6 Drawing Sheets

(51) Int. Cl.
*H04N 23/57* (2023.01)
*H04N 23/68* (2023.01)
*H04N 23/67* (2023.01)

(56) References Cited

FOREIGN PATENT DOCUMENTS

| | | |
|---|---|---|
| CN | 212460149 U | 2/2021 |
| CN | 112468732 A | 3/2021 |
| CN | 112702534 A | 4/2021 |
| CN | 112770060 A | 5/2021 |
| KR | 20190002852 A | 1/2019 |
| WO | 2019172163 A1 | 9/2019 |

* cited by examiner

PHOTOSENSITIVE CHIP DRIVE DEVICE AND CAMERA MODULE

CROSS REFERENCE OF RELATED APPLICATION

This application is a continuation of International Application No. PCT/CN2022/093534, filed on May 18, 2022, which claims priority to Chinese Patent Application No. CN202110645232.2, filed on Jun. 10, 2021, the contents of which are incorporated herein by reference in their entirety

FIELD OF INVENTION

The present disclosure relates to the technical field of camera modules, in particular to a photosensitive chip driving device and a camera module.

DESCRIPTION OF RELATED ARTS

In the field of consumer electronics, especially in the field of smart phones, miniaturized and portable camera modules are indispensable components. At present, at least one camera module is configured on the portable terminal body. In order to meet the more and more extensive market demand, higher requirements are put forward for the characteristics of high pixel and high frame rate of the camera module, which is an irreversible development trend of the conventional camera module.

The motor is an indispensable component of the high-pixel camera module. During the operating process of the camera module, the motor can drive the lens to move in multiple directions to realize the optical auto-focus function (hereinafter referred to as AF function, Auto Focus) and optical anti-vibration function (hereinafter referred to as OIS function, Optical Image Stabilization). AF function refers to the function that the supporting frame with lens moves linearly in the optical axis direction by the motor to focus the subject, so as to produce a clear image at the imaging sensor (CMOS, CCD, etc.) located at the rear of the lens. OIS function refers to the function that when the lens has vibration caused by vibration, the supporting frame with the lens adaptively moves in the direction of compensating the vibration by the motor, for improving image clarity.

With the higher and higher requirements of imaging quality of mobile phone camera module, the size and weight of the lens are getting bigger and bigger, and the driving force of the motor is required to be higher and higher. However, the current electronic devices (such as mobile phones) have many limitations on the size of the camera module, and the occupied size of the motor increases correspondingly with the increase of the lens. In other words, with the development of the lens to a larger size and more weight, the driving force provided by the motor is difficult to increase accordingly. On the premise of limited driving force, the heavier the lens, the shorter the distance that the motor can drive the lens to move, which affects the focusing and anti-vibration ability. In order to achieve better light-focusing function and optical anti-vibration function, it is usually necessary to move at a larger distance.

On the other hand, due to the increase of lens weight, the motor-driven lens moves slowly; and the longer the lens reaches the predetermined compensation position, it will directly affect the focusing and anti-vibration effect, resulting in unclear images. If needed to increase the driving force of the motor, it needs to increase the size of the motor, which leads to the complexity of the motor apparatus, the increase of the number of components, and tends to increase the thickness of the electronic device.

SUMMARY OF THE PRESENT INVENTION

An object of the present disclosure is to provide a photosensitive chip driving device and a camera module. The magnetic force generated between a magnetic member and a magnet along the optical axis direction is conducive to maintaining the stability of a movable carrier in the camera module, maintaining the centering effect, and effectively preventing the photosensitive assembly with the movable carrier from falling off due to vibration or inversion of the camera module.

Another object of the present disclosure is to provide a photosensitive chip driving device and a camera module. Separating optical anti-vibration and auto-focus is conducive to obtaining a large anti-vibration distance and a large focusing distance, which is beneficial to compensate for the large vibration of the camera module without increasing the motor size and ensuring the miniaturization of the camera module.

Another object of the present disclosure is to provide a photosensitive chip driving device and a camera module, which have a simple structure and can ensure the miniaturization of the camera module, and realize the anti-vibration correction function and the reset function of the photosensitive assembly on the orthogonal plane of the optical axis and the AF function of the lens in the optical axis direction.

Another object of the present disclosure is to provide a photosensitive chip driving device and a camera module, which ensures displacement accuracy, reduces friction, and is conducive to improving the anti-vibration distance of the camera module by a supporting apparatus and a guiding slot.

In order to achieve the above object, the technical proposal of the present disclosure is that a photosensitive chip driving device comprises a movable carrier, a fixed base, a diving apparatus, a guiding slot, a supporting apparatus and a magnetic member, where the movable carrier is employed to carry a photosensitive assembly, the fixed base and the movable carrier are disposed correspondingly at intervals along the optical axis direction, the diving apparatus comprises at least one group of coils and at least one group of magnets, the magnets are mounted on the peripheral side of the fixed base, at least one group of coils is mounted on the peripheral side of the movable carrier, the guiding slot is disposed between the movable carrier and the fixed base, the supporting apparatus is movably disposed in the guiding slot, the magnetic member is mounted on the movable carrier and corresponds to the magnet, so as to generate a magnetic force between the magnetic member and the magnets along the optical axis direction, so as to clamp the supporting apparatus between the fixed base and the movable carrier.

As an option, the at least one group of coils comprises at least a second coil, the second coil is mounted on the peripheral side of the movable carrier, the magnets and the second coil are axially disposed correspondingly, the second coil and the magnets form a second magnetic field loop to drive the movable carrier to move relative to the fixed base along the orthogonal plane of the optical axis and to correct the vibration of the photosensitive assembly, and the magnetic member is disposed in the photosensitive assembly with the movable carrier to drive the photosensitive assembly to reset along the orthogonal plane of the optical axis.

As an option, the magnets and the second coil are axially disposed correspondingly, the magnetic member is located on a rear surface of the second coil, and the magnetic member and the second coil are axially fixed around the movable carrier correspondingly.

As an option, the guiding slot comprises a plurality of tracks, the tracks are respectively disposed on the facing surfaces of the movable carrier and the fixed base, and each supporting apparatus is received in each track, so that the supporting apparatus rotatably supports the movable carrier to move radially along the orthogonal plane of the optical axis.

As an option, the guiding slot is provided with a first track and a second track, the first track and the second track have a cross structure and are respectively located at the intervals of the adjacent second coils, the first track is disposed on the upper surface of the movable carrier along the X direction or Y direction, and the second track is relatively disposed on the lower surface of the fixed base along the Y direction or X direction, so that the supporting apparatus can move in the first track or the second track.

As an option, the number of the supporting apparatus is at least three, the number of the guiding slots is at least three pairs, and the supporting apparatus is balls.

As an option, the number of the guiding slots and the supporting apparatus are respectively four, the guiding slots are respectively recessed at four facing corners of the movable carrier and four facing corners of the fixed base, and the supporting apparatus rotatably supports the four corners of the movable carrier.

As an option, the cross-sectional structures of the first track and the second track are U-shaped, V-shaped, or trapezoidal.

As an option, an axial distance is formed between the second coil and the magnets, the axial distance being 0.05 to 0.5 mm, preferably the axial distance being 0.1 to 0.3 mm, preferably the axial distance being 0.1 mm.

As an option, the magnetic member and the guiding slot are sequentially disposed at intervals on the orthogonal plane of the optical axis, the magnetic member is an iron sheet, the number of magnets is four, the number of the second coils and the number of the magnetic members are equal with the number of the magnets, and the magnets are disposed along four peripheral sides of the fixed base.

As an option, the photosensitive chip driving device further comprises a carrier frame, the carrier frame comprises a lens carrier and the fixed base disposed on the outer periphery of the lens carrier, the lens assembly is received in the lens carrier, the at least one group of coils further comprises at least one first coil, the magnets and the first coil are radially disposed correspondingly, and the first coil and the magnets form a first magnetic field loop to drive the lens carrier to move along the optical axis direction, for automatic focusing.

As an option, the fixed base is provided with a receiving cavity; a first opening, and a second opening, where the receiving cavity is disposed around the fixed base, the first opening is disposed at the radially inner side of the receiving cavity, the second opening is disposed at the axial lower side of the receiving cavity, and the magnets are fixed in the receiving cavity.

As an option, the carrier frame further comprises an elastic supporter elastically connected to the lens carrier and the fixed base, the elastic supporter supports the lens carrier to move and focus relative to the fixed base along the optical axis direction, the elastic supporter comprises an upper elastic piece movably connecting the upper surface of the lens carrier and the fixed base, a lower elastic piece movably connecting the lower surface of the lens carrier and the fixed base, and at least one pair of extending portions electrically conducted to the fixed base and the elastic supporter so that the first coil is electrically connected to the fixed base.

As an option, the extending portions are two or four, respectively fixed at the corners of the fixed base, each of the extending portions comprises a first fixed end, a second fixed end, and a suspended wire, the suspended wire curvingly connecting the first fixed end and the second fixed end, and the first fixed end is fixed to the fixed base.

As an option, the magnets comprise a first magnet and at least two second magnets, the first magnet is disposed on one side of the fixed base, and the first magnet and the first coil are radially disposed correspondingly to drive the lens carrier to move along the optical axis, the second magnet is disposed on the other adjacent two sides of the fixed base, the second magnet and the second coil are axially disposed correspondingly to drive the movable carrier to move along the orthogonal plane of the optical axis.

As an option, the driving distance of the diving apparatus for the lens carrier along the optical axis direction is ±250 μm, and the driving distance of the diving apparatus for the movable carrier along the orthogonal plane direction of the optical axis is ±150 μm.

The present disclosure relates to a camera module, comprising the mentioned photosensitive chip driving device, a lens assembly, and a photosensitive assembly, where the lens assembly is provided with at least one lens, the lens assembly is disposed in the fixed base, the photosensitive assembly is capable of photosensitive imaging, and the photosensitive chip driving device is employed to drive the photosensitive assembly to move along the orthogonal plane direction of the optical axis.

As an option, the photosensitive assembly comprises a filter, a circuit board, a photosensitive chip, and an electronic component, the coil is electrically connected to the circuit board, the photosensitive chip and the electronic component are electrically connected to the circuit board, the filter is attached inside the movable carrier, and the circuit board and the photosensitive chip are located at the rear of the movable carrier.

As an option, a circuit is integrally molded in the fixed base by an embedded injection molding mode, and the fixed base is electrically connected to the circuit board.

As an option, an LDS slot is disposed on the outer surface of the fixed base, and a conductive plating layer is plated on the surface of the LDS slot. The fixed base is electrically connected to the circuit board via the conductive plating layer of the LDS slot.

As an option, it further comprises a shell, the photosensitive chip driving device, and the photosensitive assembly are received inside the shell, and the fixed base is fixedly connected to the shell.

As an option, the movable carrier comprises a frame body and an extending arm formed by extended inward from the frame body, and the filter is attached to the extending arm.

As an option, the extending arm can have a step-type structure, the filter is attached to the upper step of the extending arm, and the non-optical area of the photosensitive chip or the circuit board is attached to the lower step of the extending arm.

REFERENCES IN THE DRAWINGS 1. lens assembly; 2. photosensitive chip driving device; 10. movable carrier; 11. frame main body; 12. extending arm; 13. extending column; 20. carrier frame; 21. lens carrier; 22. fixed base; 221. containing cavity; 222. first opening; 223. second opening; 23. elastic supporter; 231. upper elastic piece; 232. lower elastic piece; 233. extending portion; 233a. conductive extending portion; 233b. reset extending portion; 234a. upper inner contour; 235a. upper outer contour; 236a. upper elastic portion; 234b. lower inner contour; 235b. lower outer contour; 236b. lower elastic portion; 237. first fixed end; 238. second fixed end; 239. suspended wire; 30. diving apparatus; 31. first coil; 32. second coil; 33. magnets; 41. guiding slot; 411. first track; 412. second track; 42. supporting apparatus; 43. magnetic member; 50. shell; 51. first shell body; 52. second shell body; 60. photosensitive assembly; 61. filter; 62. circuit board; 63. photosensitive chip; 64. electronic component.

DETAILED DESCRIPTION OF THE EMBODIMENTS

Hereinafter, the present disclosure will be further described in connection with specific embodiments, and it should be noted that the embodiments described below or the technical features can be combined at random to form a new embodiment without conflict.

In the description of the present disclosure, it should be noted that the terms "center", "transverse", "longitudinal", "length", "width", "thickness", "up", "down", "front", "rear", "left", "right", "vertical", "horizontal", "top", "bottom", "inner", "outer", "clockwise", "counterclockwise" and the like, for orientation terms, indicate orientation and positional relationships based on those shown in the drawings, are intended for ease of description and simplification of the present disclosure only, and are not intended to indicate or imply that the device or element referred to must have a particular orientation, be constructed and operated in a particular orientation, and cannot be construed as limiting the specific scope of the present disclosure.

It should be noted that the terms "first", "second" and the like in the specification and claims of the present disclosure are used to distinguish similar objects and need not be used to describe a particular order or priority.

The terms "comprise" and "have" and any variations thereof in the specification and claims of the present disclosure are intended to cover non-exclusive inclusion, for example, processes, methods, systems, products, or devices that comprise a series of steps or units need not be limited to those clearly listed, but can comprise other steps or units not explicitly listed or inherent to such processes, methods, products, or devices.

It should be noted that, as used in the present disclosure, the terms "substantially", "approximately", and the like are used as terms indicative of approximation and not as terms indicative of degree, and are intended to illustrate inherent deviations in measured or calculated values as will be recognized by those of ordinary skill in the art.

In the description of the present disclosure, it should also be noted that the terms "dispose", "mount", "arrange" and "connect" are understood broadly, for example, to be fixed, detachable, or integrally connected, unless otherwise expressly specified and limited. It can be a mechanical connection or an electrical connection. It can be a direct connection, a contact connection, or an indirect connection via an intermediate medium, and it can be a communication between the two elements. The specific meanings of the above terms in the present disclosure can be understood by those of ordinary skill in the art on a case-by-case basis.

According to the first aspect of the present disclosure, a photosensitive chip driving device 2 is provided, as shown in FIGS. 1 to 7. The photosensitive chip driving device 2 comprises a carrier frame 20 for receiving the lens assembly 1, a movable carrier 10, a diving apparatus 30, a guiding slot 41, a supporting apparatus 42 and a magnetic member 43, wherein the carrier frame 20 and the movable carrier 10 are disposed correspondingly at intervals along the optical axis direction, the diving apparatus 30 comprises at least one group of coils and at least one group of magnets 33 mounted on the peripheral side of the carrier frame 20, at least one group of coils is mounted on the peripheral side of the movable carrier 10, the guiding slot 41 is disposed between the movable carrier 10 and the carrier frame 20, the supporting apparatus 42 is movably disposed in the guiding slot 41, and the magnetic member 43 is mounted the movable carrier 10 and disposed correspondingly to the magnets 33, so that a magnetic force along the optical axis direction is generated between the magnetic member 43 and the magnets 33, and the movable carrier 10 is displaced along the orthogonal plane of the optical axis. Thus, the supporting apparatus 42 supports the relative movement between the movable carrier 10 and the carrier frame 20 along the guiding slot 41, which provides support and guidance for the movable carrier 10, and improves displacement accuracy and anti-vibration distance. Further, the magnetic force is generated along the optical axis and between the magnetic member 43 and the magnets 33, via the magnetic member 43 and the magnets 33 disposed correspondingly in the optical axis direction, so that the stability of the movable carrier 10 carrying the second coil 32 in the camera module is maintained conveniently, and the photosensitive assembly 60 with the movable carrier 10 is maintained in the center, for effectively preventing the movable carrier 10 from falling off due to vibration or inversion of the camera module.

The magnetic member 43 and the magnets 33 are disposed correspondingly along the optical axis direction and generate magnetic force along the optical axis direction. Since the magnetic member 43 and the magnets 33 are not completely aligned, as the movable carrier 10 moves radially along the orthogonal plane of the optical axis or rotates around the optical axis, the offset will occur between the magnets 33 and the magnetic member 43, but the plane where the magnets 33 is located and the plane where the magnetic member 43 is located are always parallel. Further, the plane where the magnets 33 is located and the plane where the magnetic member 43 is located are orthogonal to the optical axis respectively, so "magnetic force generated between the magnetic member 43 and the magnets 33 along the optical axis direction" refers to the magnetic force generated between the plane where the magnets 33 is located and the plane where the magnetic member 43 is located, comprising but not limited to the magnetic force in the vertical direction, offset the inclined magnetic attraction in the vertical direction.

In the present embodiment, orthogonal coordinate systems (X, Y, Z) are used. The Z direction is an optical axis direction and is a front-rear direction. The X direction and the Y direction orthogonal to the Z direction are the orthogonal optical axis direction. The X direction is an up-down direction (or a left-right direction), the Y direction is a left-right direction (or an up-down direction), and the plane orthogonal to the optical axis is a plane formed by the X direction and the Y direction. The "radial" is a direction orthogonal to the Z axis, and the "axial" refers to two corresponding arrangements between orthogonal planes of the Z axis, comprising not only a direction parallel to the Z axis but also a direction nearly parallel to the Z axis.

In some embodiments, the at least one group of coils comprises at least one first coil 31 and at least one second coil 32. The magnets 33 are respectively spaced apart from the first coil 31 and the second coil 32. The first coil 31 and the magnets 33 form a first magnetic field loop to drive the carrier frame 20 to move along the optical axis direction for auto-focusing. The second coil 32 and the magnets 33 form a second magnetic field loop to drive the movable carrier 10 to move along the orthogonal plane direction of the optical axis relative to the carrier frame 20 for vibration correction.

In some embodiments, the carrier frame 20 comprises a lens carrier 21 and a fixed base 22 disposed on the outer periphery of the lens carrier 21, the lens assembly 1 is received in the lens carrier 21, the first coil 31 is disposed on the outer periphery of the lens carrier 21, the magnets 33 are fixed on the peripheral side of the fixed base 22, the magnets 33 and the first coil 31 are radially disposed correspondingly, and the magnets 33 and the second coil 32 are axially disposed correspondingly, the second coil 32 is disposed on the movable carrier 10, and the movable carrier is fixed to the photosensitive assembly 60. The radially disposed correspondingly of the magnets 33 and the first coil 31 means that the magnets 33 and the first coil 31 are facing disposed in the X direction or the Y direction, and the axially disposed correspondingly of the magnets 33 and the second coil 32 means that the magnets 33 and the second coil 32 are facing disposed in the Z direction. The fixed base 22 is a stator.

If the first coil 31 is energized, the first magnetic field loop is formed based on the interaction between the magnetic field generated by the magnets 33 and the current flowing in the first coil 31, and a Lorentz force is generated to drive the lens carrier 21 with the first coil 31 to move in the Z direction relative to the fixed base 22, thereby driving the lens assembly 1 to move in the Z direction to realize auto-focusing. The Lorentz force is in a direction (Z direction) orthogonal to the direction of the magnetic field (X direction or Y direction) and the direction of the current in the first coil 31 (Y direction or X direction).

If the second coil 32 is energized, a Lorentz force is generated based on the interaction between the magnetic field of the magnets 33 and the current flowing in the second coil 32 to drive the movable carrier 10 with the second coil 32 to move in the X direction or the Y direction, thereby driving the photosensitive assembly 60 to move in the X direction or the Y direction to realize the OIS anti-vibration correction. The direction of the Lorentz force in the second magnetic field loop is a direction (Y direction or X direction) orthogonal to the direction of the magnetic field (Z direction) and the direction of the current (X direction or Y direction).

In some embodiments, the magnetic member 43 is located on the rear surface of the second coil 32, and the magnetic member 43 and the second coil 32 are fixed around the movable carrier 10 so as to be axially disposed correspondingly. That is, the magnetic member 43, which can be built into the movable carrier 10 as the magnetic member 43 is completely covered by the movable carrier 10, is overlapped with the second coil 32 fixed to the surface of the movable carrier 10, so to avoid increasing the height of the photosensitive chip driving device 2. The magnetic member 43 can also be embedded in the movable carrier 10, as the magnetic member 43 is partially embedded in the movable carrier 10, the front surface of the magnetic member 43 is higher than the surface of the movable carrier 10, and the second coil 32 is overlay on the front surface of the magnetic member 43. The magnetic member 43 can also be placed horizontally on the surface of the movable carrier 10, and the second coil 32 is overlay on the front surface of the magnetic member 43. The magnetic member 43 and the second coil 32 are both disposed corresponding to the magnets 33. The number of the magnetic members 43 is the same as the number of the magnets 33 and is at least three.

The magnetic member 43 is disposed corresponding to the magnets 33 in the Z direction instead of in the X direction or Y direction (for example, the magnetic member 43 is disposed on the side wall of the shell 50). When the magnetic member 43 is disposed on the side wall of the shell 50, the magnetic member 43 generates magnetic force in the X direction or Y direction to the magnets 33. In a case where the OIS distance increases, the distance between the magnets 33 and the magnetic member 43 will increase, and the magnetic force will decrease, resulting in difficulty in resetting the movable carrier 10. Without the magnetic member 43 and the magnets 33 in the X direction or the Y direction, the magnetic member 43 and the magnets 33 disposed correspondingly in the Z direction is conducive to generating the attraction force in the Z direction to the magnets 33. In a case where the required distance of the magnets 33 on the orthogonal plane of the optical axis increases, the distance between the magnetic member 43 and the magnets 33 is not affected by the OIS distance, which is conducive for the movable carrier 10 to realize a larger OIS distance and is beneficial to quick reset.

In some embodiments, the magnetic member 43 is a material such as an iron sheet and the like that can attract each other with the magnets 33 and generate a magnetic attraction. The fixed base 22 and the movable carrier 10 are rubbed and contacted by the supporting apparatus 42 by the magnetic force between the iron sheet and the magnets 33, so that the stability of the movable carrier 10 in the camera module is maintained, and the movable carrier 10 is maintained in the center without falling off with the vibration or inversion of the camera module. Further, the movable carrier 10 is quickly restored to an initial position after optical anti-vibration by the magnetic force between the magnetic member 43 and the magnets 33, and the initial position is the position of the movable carrier 10 before optical anti-vibration.

In some embodiments, the guiding slot 41 comprises a plurality of tracks, the tracks are respectively disposed on the facing surfaces of the movable carrier 10 and the fixed base 22, and each supporting apparatus 42 is received in each track, so that the supporting apparatus 42 is rotatably support the movable carrier 10 to move radially along the orthogonal plane of the optical axis. Thus, the track is provided between the movable carrier 10 and the fixed base 22, and the supporting apparatus 42 is received in the track, so that the supporting apparatus 42 maintains dynamic support for the movable carrier 10 during the process of moving the movable carrier 10 in the X direction and/or the Y direction relative to the fixed base 22 during optical anti-vibration, so that the movable carrier 10 slides smoothly and the displacement accuracy is ensured.

Figure 1:
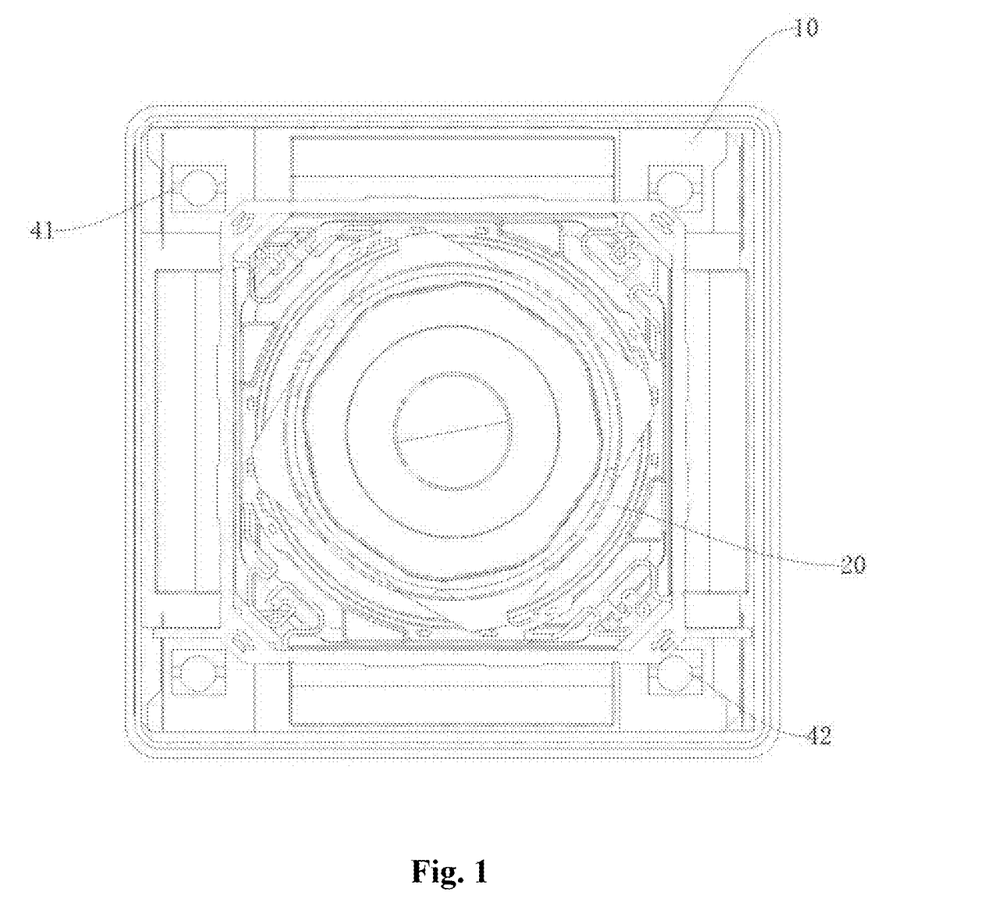
FIG. 1 is a schematic structural view of a camera module according to an embodiment of the present disclosure.
Figure 2:
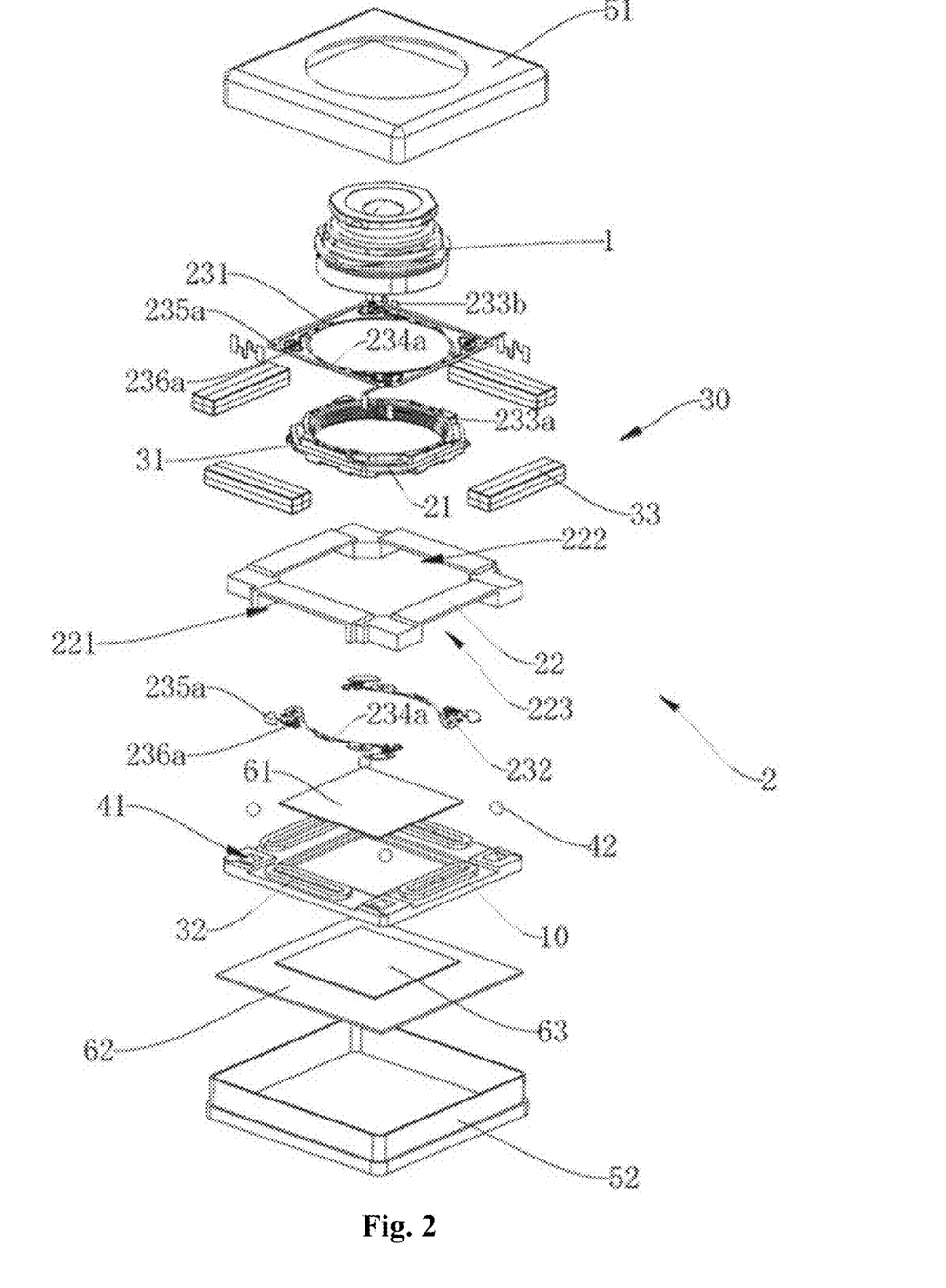
FIG. 2 is an exploded view of the camera module according to the embodiment of the present disclosure.
Figure 3:
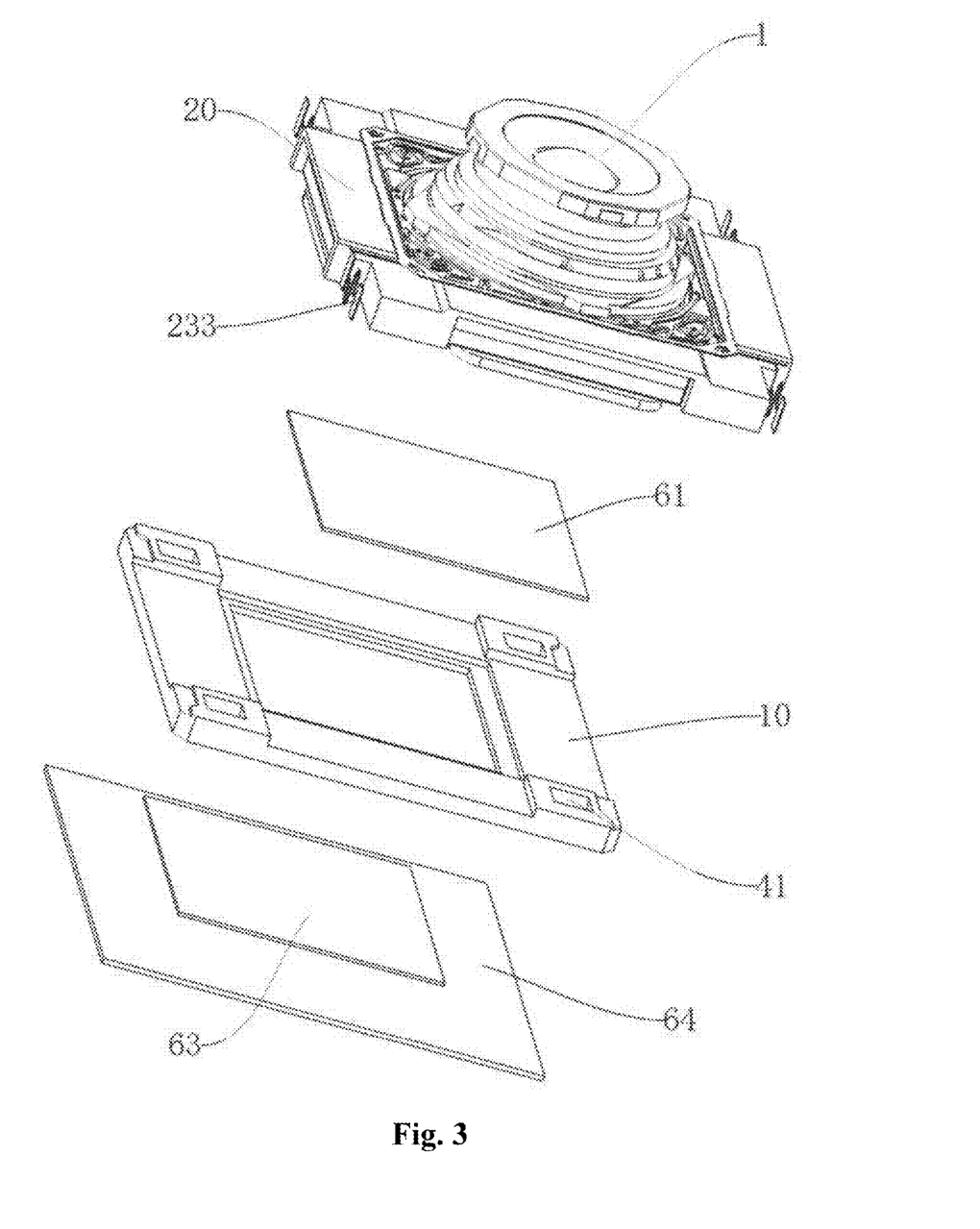
FIG. 3 is a schematic structural view of a photosensitive assembly according to the embodiment of the present disclosure.
Figure 4:
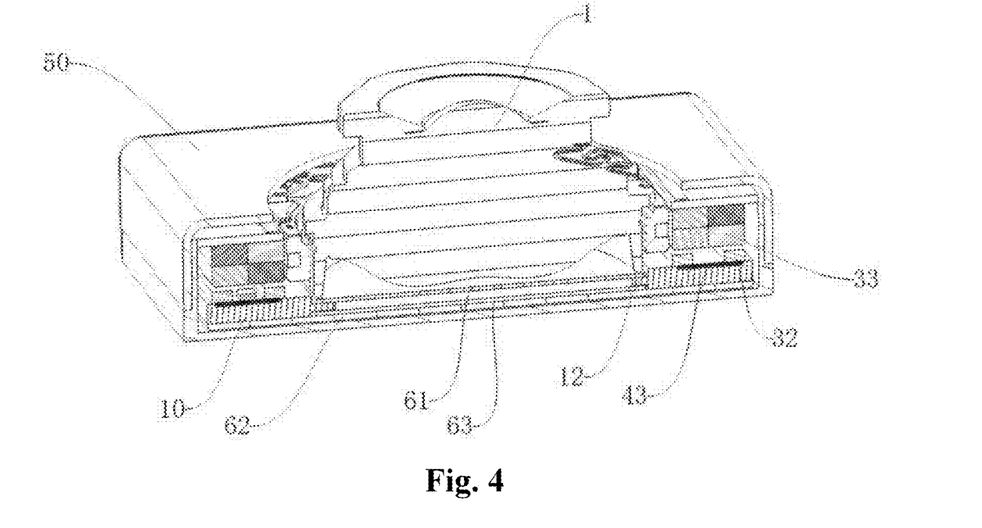
FIG. 4 is a schematic sectional view of the camera module according to the embodiment of the present disclosure.
Figure 5:
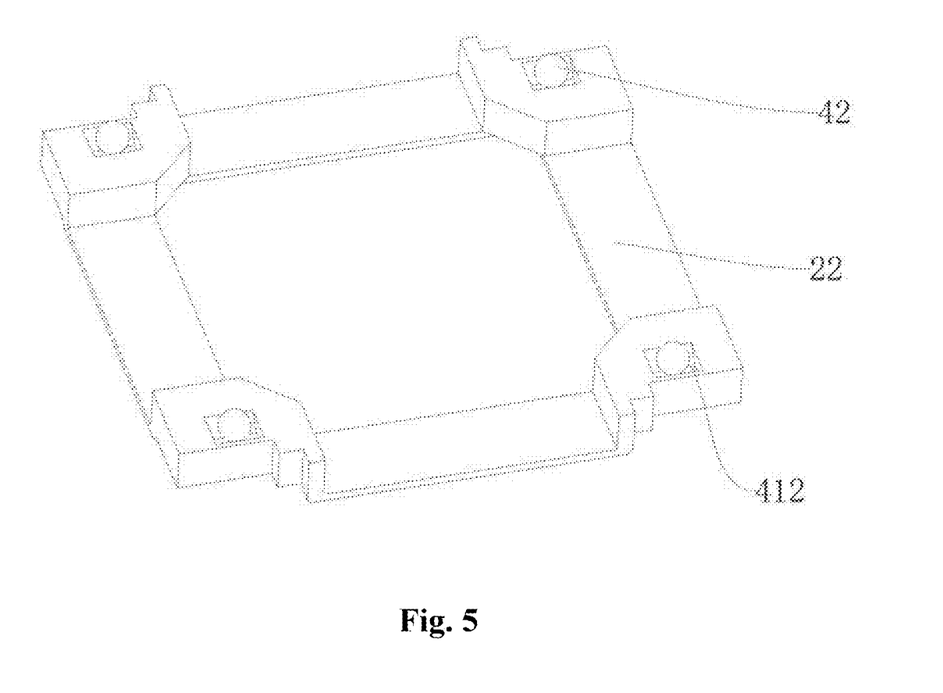
FIG. 5 is a schematic structural view of a fixed base and a supporting apparatus according to the embodiment of the present disclosure.
Figure 6:
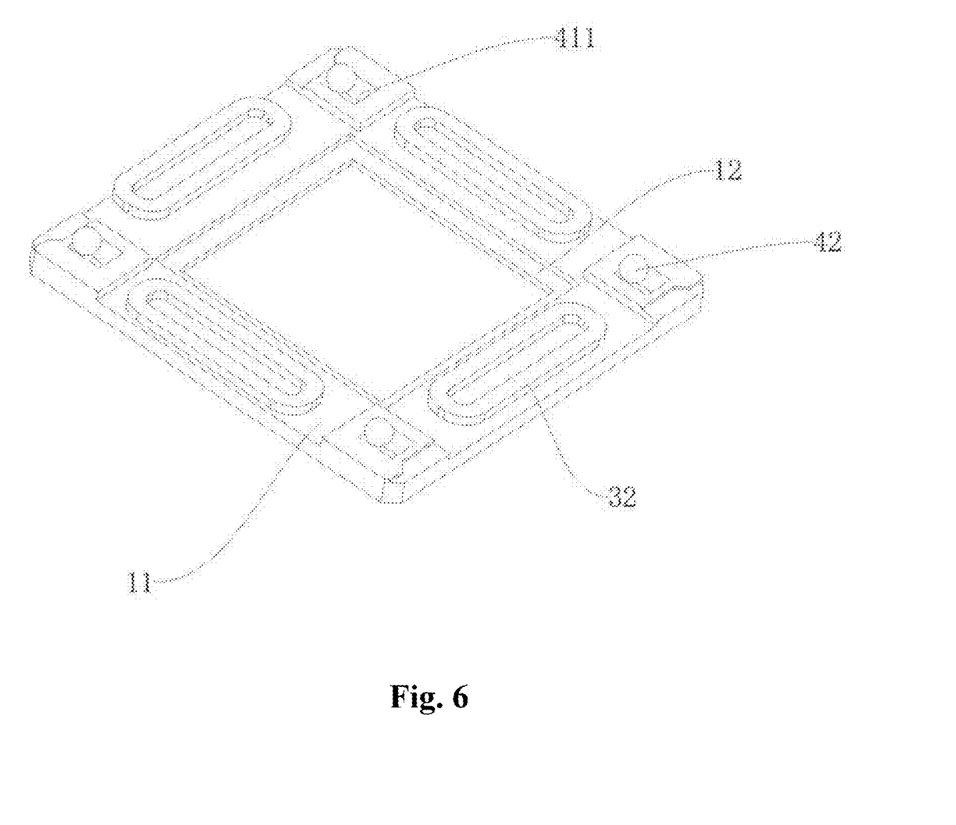
FIG. 6 is a schematic structural view of a movable carrier and the supporting apparatus according to the embodiment of the present disclosure.
Figure 7:
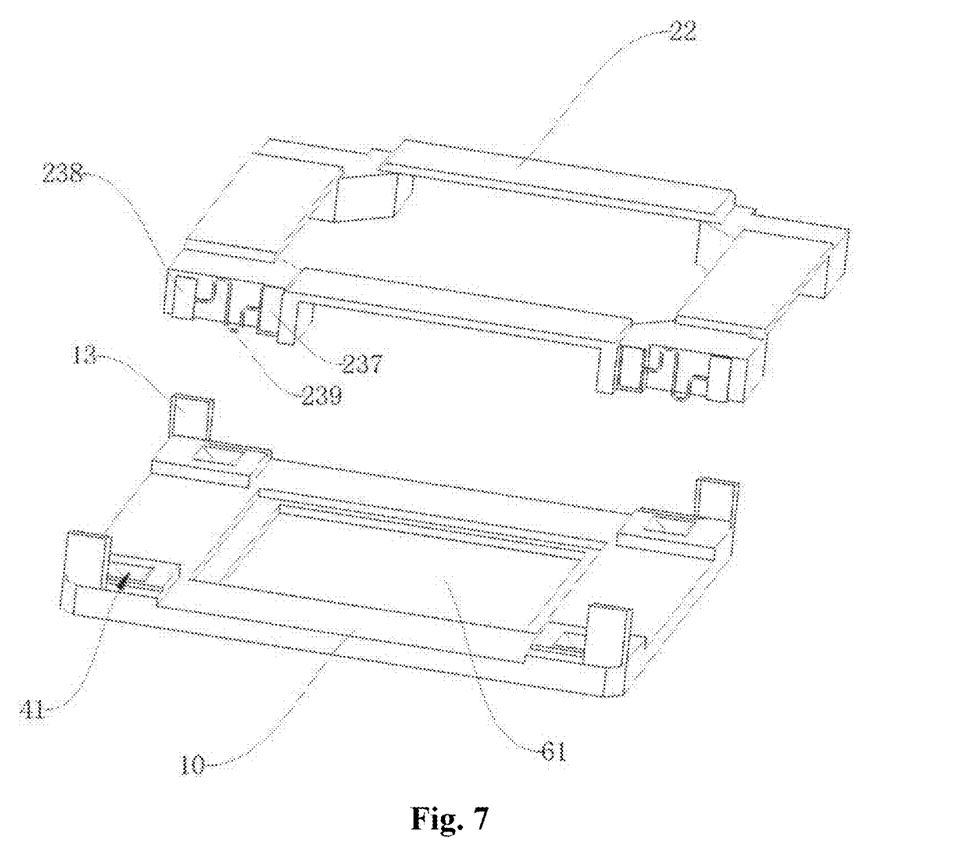
FIG. 7 is a schematic structural view of the movable carrier and an extending portion according to the embodiment of the present disclosure.

In some embodiments, the guiding slot 41 is provided with a first track 411 and a second track 412, the first track 411 and the second track 412 having a cross structure, respectively located at the intervals of the adjacent second coils 32, the first track 411 is opened on the upper surface of the movable carrier 10 in the X direction or Y direction, and the second track 412 is opened on the lower surface of the fixed base 22 in the Y direction or X direction relative to the first track 411, allowing the supporting apparatus 43 to move between the first track 411 and the second track 412, the supporting apparatus 42 being balls, as shown in FIGS. 5 and 6. Therefore, by arranging the first track 411 and the second track 412 in different directions, the movement directions of the supporting apparatus 43 are limited within the track, which is conducive to guiding the movable carrier 10 in the moving process. Further, rolling friction is used instead of sliding friction via the balls, which further reduces the friction between the fixed base 22 and the movable carrier 10, effectively improves the movement stability of the movable carrier 10 in the optical anti-vibration process, and improves the imaging quality.

The upper surface of the movable carrier 10 and the lower surface of the fixed base 22 are along the optical axis direction, and the direction from the movable carrier 10 to the fixed base 22 is from bottom to top.

In some embodiments, the number of the supporting apparatus 42 is at least three, the number of the guiding slots 41 is at least three pairs, the number of the magnets 33 is at least three, and each of the guiding slots 41 is provided with a ball.

The number of the guiding slots 41 and the supporting apparatus 42 is four respectively, the magnetic members 43 and the guiding slots 41 are sequentially disposed at intervals on the orthogonal plane of the optical axis, and the position of the guiding slots 41 can be disposed on the corners of the orthogonal plane of the optical axis, the magnetic members 43 can be disposed on the four sides of the movable carrier 10, or the position of the guiding slots 41 can be disposed on the four sides of the orthogonal plane of the optical axis, and the magnetic members 43 can be disposed on the four corners of the movable carrier 10.

In some embodiments, the guiding slot 41 is recessed at opposite corners of the movable carrier 10 and the fixed base 22, respectively; and the supporting apparatus 42 can be rotatably supported on the four corners of the fixed base 22 and the movable carrier 10, thereby contributing to maintaining the stability of the movable carrier 10. And the guiding slot 41 and the supporting apparatus 42 are disposed at the four facing corners of the movable carrier 10 and the fixed base 22, so that the free space of the movable carrier 10 and the fixed base 22 can be fully utilized, thereby providing a larger space position for the guiding slot 41 to have a longer longitudinal size, so that in a case where the movable carrier 10 is guided by the guiding slot 41 and the supporting apparatus 42, a larger moving distance can be provided for the movable carrier 10, thereby facilitating the realization of optical anti-vibration with a larger distance.

As for the guiding slot 41 provided in the X direction, the length of the guiding slot 41 opened in the X direction is larger than the diameter of the supporting apparatus 42, and the size in the Y direction is equal to or slightly larger than the diameter of the supporting apparatus 42, thus ensuring the movement of the supporting apparatus 42 in the X direction. As for the guiding slot 41 provided in the Y direction, the length in the Y direction is larger than the diameter of the supporting apparatus 42, and the size in the X direction is equal to or slightly larger than the diameter of the supporting apparatus 42, so that the supporting apparatus 42 is ensured to move in the Y direction.

In some embodiments, the number of the magnets 33 is four, and the number of the second coils 32 and the number of the magnetic member 43 are equal to the number of the magnets 33. The magnets 33 are disposed along the four peripheries of the fixed base 22, and the magnets 33 and the magnetic member 43 are correspondingly disposed. The magnetic member 43 is disposed on the upper surface of the movable carrier 10 and on the four sides of the movable carrier 10. The second coils 32 overlays on the magnetic member 43, and the magnetic force is generated between the fixed base 22 and the movable carrier 10 via the magnetic member 43 and the magnets 33, the magnets 33 are located on the four sides of the fixed base 22, and since the four sides of the fixed base 22 have a larger space, a larger driving force can be provided.

In some embodiments, the first track 411, and the second track 412 have a U-shaped V-shaped or trapezoidal cross-sectional configuration.

In some embodiments, the second coil 32 is disposed on four sides of the movable carrier 10 and corresponding to the magnets 33, and an axial distance is formed between the second coil 32 and the magnets 33, the axial distance being 0.05-0.5 mm, preferably 0.1-0.3 mm, preferably 0.1 mm. Thus, the magnets 33 does not contact with the second coil 32 to cause interference, and good magnetic induction can be generated.

In some embodiments, the first coil 31 is attached to the outer side wall of the lens carrier 21, and the magnets 33 is a dual-purpose magnet, i.e. a common magnet of the first coil 31 and the second coil 32. In a case where the autofocusing is operated, the first coil 31 is energized to generate electromagnetic induction with the magnets 33 to drive the first coil 31 and then drive the lens carrier 21 to move along the optical axis direction, thus realizing the AF of the lens. Since only the lens carrier 21 and the lens assembly 1 in the lens carrier 21 need to be driven to move, relatively speaking, the AF process only needs a small driving force to realize and reduce power consumption. In a case where the optical anti-vibration is operated, the second coil 32 can generate electromagnetic induction with the magnets 33 after being energized, so as to drive the second coil 32 to drive the movable carrier 10 and then drive the photosensitive assembly 60 to move, so that the photosensitive assembly 60 as a whole moves along the orthogonal plane direction of the optical axis. Four groups of the second coils 32 interact with the magnets 33 to generate greater driving force. In the present disclosure, the AF distance and the OIS distance are separately controlled to avoid interference between the AF and the OIS and to reduce the burden of the respective components.

Each of the magnets 33 comprises four magnetic poles, and each N pole and S pole are disposed adjacent to each other. Since the magnets 33 are dual-purpose magnets, the number of components can be reduced, and the structure of the photosensitive chip driving device 2 is simple. The first coil 31 and the second coil 32 can be provided with other position sensing devices such as IC and Hall devices so as to correspond to the magnets 33 for detecting the position of the magnets 33.

In some embodiments, the first coil 31 and the second coil 32 cannot share the magnets 33. The first coil 31 is disposed on the peripheral side of the lens carrier 21. The magnets 33 comprise a first magnet and at least two second magnets. The first magnet is disposed on one side of the fixed base 22. The first magnet and the first coil 31 are disposed in a radial direction. In a case where the first coil 31 is energized, a magnetic field force is generated between the first magnet and the first coil 31 to drive the lens carrier 21 to move along the optical axis. The second magnet is disposed on another adjacent side of the fixed base 22. After being electrically activated, a magnetic field force is generated between the second magnet and the second coil 32 to drive the photosensitive assembly 60 with the movable carrier 10 to move along the orthogonal plane of the optical axis. The second magnet can also be disposed on the other three sides of the fixed base 22, or the first magnet can be disposed on the adjacent two sides of the fixed base 22, and the second magnet can be disposed on the other adjacent two sides of the fixed base 22.

In some embodiments, the number of the second magnets is two, and the second magnets are disposed on two adjacent sides of the fixed base 22, and optical anti-vibration in the X direction and Y direction has been realized.

In some embodiments, the fixed base 22 is provided with a receiving cavity 221 located around the fixed base 22, a first opening 222 opened in the radial inner side of the receiving cavity 221, and a second opening 223 opened in the axial lower side of the receiving cavity 221. The magnets 33 are fixed in the receiving cavity 221. The receiving cavity 221 is located at four sides of the fixed base 22, the receiving cavity 221 is an open cavity; the magnets 33 are fixed in the receiving cavity 221 by sticking upside down, the magnets 33 are disposed corresponding to the first coil 21 from a distance, and the magnets 33 are disposed corresponding to the second coil 32 from a distance.

In some embodiments, the carrier frame 20 further comprises an elastic supporter 23 elastically connected to the lens carrier 21 and the fixed base 22 to support the lens carrier 21 to move and focus relative to the fixed base 22 in the optical axis direction. The elastic supporter 23 comprises an upper elastic piece 231 movably connecting the lens carrier 21 and the upper surface of the fixed base 22, a lower elastic piece 232 movably connecting the lens carrier 21 and the lower surface of the fixed base 22, and at least a pair of extending portions 233 electrically conducted the fixed base 22 and the elastic supporter 23, so that the first coil 31 is electrically connected to the fixed base 22. The upper elastic piece 231 and the lower elastic piece 232 can be respectively fixed to the side wall of the fixed base 22 which is not limited in the present disclosure. Thus, the lens carrier 21 can be centered by the elastic supporter 23, which holds the lens carrier 21 in the fixed base 22 by an elastic force. Further, the elastic supporter 23 pulls the lens carrier 21 back to an initial position by an elastic force, where the initial position is a position before the lens carrier 21 is AF displaced in the optical axis direction. The upper surface and the lower surface are the directions of the lens carrier 21 and the fixed base 22 along the optical axis, respectively. The front of the optical axis is the upper surface, and the rear of the optical axis is the lower surface.

In some embodiments, the upper elastic piece 231 comprises an upper inner contour 234a, an upper outer contour 235a, and an upper elastic portion 236a, the upper elastic portion 236a elastically connecting the upper inner contour 234a and the upper outer contour 235a so that the upper inner contour 234a and the upper outer contour 235a can move relative to each other in the Z direction. The upper inner contour 234a is fixed to the upper surface of the lens carrier 21, and the upper outer contour 235a is fixed to the upper surface of the fixed base 22, so that the upper elastic piece 231a can movably connect the upper surface of the lens carrier 21 and the upper surface of the fixed base 22. The fixing manner is not limited, comprising embedded fixed or adhesive fixed. The upper elastic portion 236a has a meandering structure and is conducive for elastically connecting the upper inner contour 234a and the upper outer contour 235a.

In some embodiments, the lower elastic piece 232 and the upper elastic piece 231 are similar in structure, and the lower elastic piece 231 comprises a lower inner contour 234b, a lower outer contour 235b and a lower elastic portion 236b elastically connecting the lower inner contour 234b and the lower outer contour 235b so that the lower inner contour 234b and the lower outer contour 235b can move relative to each other in the Z direction. The lower inner contour 234b is fixed to the lower surface of the lens carrier 21, and the lower outer contour 235b is fixed to the lower surface of the fixed base 22, so that the lower elastic piece 231b can movably connect the lower surface of the lens carrier 21 and the lower surface of the fixed base 22. The fixing manner is not limited, comprising embedded fixed or adhesive fixed. The lower elastic portion 236 has a meandering structure and is conducive for elastically connecting the lower inner contour 234b and the lower outer contour 235b.

In some embodiments, each of the extending portions 233 comprises a first fixed end 237, a second fixed end 238, and a suspended wire 239 curvingly connecting the first fixed end 237 and the second fixed end 238, the first fixed end 237 fixed to the fixed base 22 and electrically connected to the fixed base 22, and a second fixed end 238 electrically connected to the upper elastic piece 231 and/or the lower elastic piece 232 to electrically conduct the first coil 31 and the fixed base 22 via the upper elastic piece 231 and/or the lower elastic piece 232.

In some embodiments, the number of the extending portions 233 can be two or four. In a case where the number of the extending portions 233 is two, circuit conduction is realized via the extending portions 233. In a case where the number of the extending portions 233 is four, one pair of the extending portions 233 realizes circuit conduction, and the other pair of the extending portions 233 realizes the reset function of the photosensitive assembly 60 via the clastic force. Further, the extending portions 233 are fixed at four corners of the fixed base 22, and one pair of extending portions 233 are integrally connected to two sides of the upper elastic piece 231 or two sides of the lower elastic piece 232, respectively, so that the first coil 31 and the fixed base 22 can be electrically connected. Thus, the electrical connection between the first coil 31 and the fixed base 22 can be realized via the circuit conduction between the extending portion 233 and the fixed base 22. The extending portion 233 can be integrated or separated with the upper clastic piece 231 or the lower elastic piece 232, the upper elastic piece 231 can be integrated or separated, and the lower clastic piece 232 can be integrated or separated. That is, the fixed base 22 integrates a conductive function, electrically connects the first coil 31 to the fixed base 22, and conducts to the outside of the photosensitive chip driving device 2 via the fixed base 22, so as to simplify the electrical connection structure of the photosensitive chip driving device 2.

In some embodiments, one pair of the extending portions 233 are provided at a pair of adjacent corners of the fixed base 22 to electrically conduct the first coil 31 and the fixed base 22, the first fixed end 237 and the second fixed end 238 are attached to the outer periphery of the fixed base 22, and the second fixed end 238 is fixed to the upper elastic piece 231 or the lower elastic piece 232. The other pair of the extending portions 233 are provided at another pair of adjacent corners of the fixed base 22. The first fixed end 237 is fixedly connected to the fixed base 22, the second fixed end 238 is fixedly connected to the movable carrier 10, the second fixed end 238 is not connected to the upper elastic piece 231 or the lower elastic piece 232, the other pair of the extending portions 233 is non-conductive, and provides a certain restoring force for OIS of the photosensitive assembly 60 by the elastic force. Optionally, the movable carrier 10 has at least two extending columns 13 extended upward from the corners of the movable carrier 10, so that the second fixed end 238 is fixedly connected to the extending columns 13, and the movable carrier 10 can be pulled back to an initial position by the elastic force of the extending portion 233. The initial position is a position before the movable carrier 10 is OIS displaced.

That is, the extending portion 233 comprises a pair of conductive extending portions 233a for electrically conducting the first coil 31 and the fixed base 22 and respectively located at a pair of ipsilateral corners of the fixed base 22, and a pair of the reset extending portions 233b respectively located at another pair of ipsilateral corners of the fixed base 22. The first fixed end 237 of the conductive extending portion 233a is fixedly connected to the fixed base 22, and the second fixed end 238 of the conductive extending portion 233a is fixedly connected to the upper elastic piece 231 or the lower elastic piece 232. The first fixed end 237 of the reset extending portion 233b is fixed to the fixed base 22, and the second fixed end 238 of the reset extending portion 233b is fixed to the extending column 13 of the movable carrier 10. The reset extending portion 233b is functional for resetting the movable carrier 10 moving along the orthogonal plane of the optical axis, and the movable carrier 10 is pulled back to an initial position by the elastic force of the reset extending portion 233b. The initial position is a position before the movable carrier 10 is OIS displaced.

In some embodiments, the driving distance of the diving apparatus 30 for the lens carrier 21 along the optical axis direction is ±250 μm, and the driving distance of the diving apparatus 30 for the movable carrier 10 along the orthogonal plane direction of the optical axis is ±150 μm.

According to a second aspect of the present disclosure, a camera module is provided, which comprises a photosensitive chip driving device 2, a lens assembly 1, and a photosensitive assembly 60. The lens assembly I is provided with at least one lens, the photosensitive chip driving device 2 is for driving the lens assembly I to move along the optical axis direction to realize the auto-focusing of the camera module, and the photosensitive chip driving device 2 is for driving the photosensitive assembly 60 to move along the orthogonal plane direction of the optical axis to realize the optical anti-vibration of the camera module.

In some embodiments, the lens assembly I comprises a lens barrel and a plurality of lenses disposed along the optical axis direction. The lens barrel can be fixed with the lens carrier 21 by adhering or buckling, or the lens assembly 1 and the lens carrier 21 can be disposed in an integrated structure, that is, the lens carrier 21 can replace the lens barrel for receiving the lenses in the lens assembly 1. In a case where the lens carrier 21 moves along the optical axis direction, the lens assembly I can be driven to move to realize the AF function. Compared with the conventional motor structure, the lens barrel is fixed in the lens carrier 21 by the lens barrel, the integrated structure can reduce the size of the lens barrel, reduce the gap between the conventional lens barrel and the lens carrier 21, and beneficial to further reduce the size of the camera module.

In some embodiments, the photosensitive assembly 60 comprises a filter 61, a circuit board 62, a photosensitive chip 63, and an electronic component 64, the coil is electrically connected to the circuit board 62, the photosensitive chip 63 and the electronic component 64 are electrically connected to the circuit board 62, the filter 61 is attached inside the movable carrier 10, and the circuit board 62 and the photosensitive chip 63 are located at the rear of the movable carrier 10. The electronic component 64 is located outside the photosensitive chip 63. Further, the movable carrier 10 comprises a frame body 11 and an extending arm 12 extended inward from the frame body 11, and the filter 61 is attached to the extending arm 12. The extending arm 12 can have a step-type structure, the filter 61 is attached to an upper step of the extending arm 12, and the non-optical region of the photosensitive chip 63 is attached to a lower step of the extending arm 12.

In some embodiments, the circuit board 62, the photosensitive chip 63, the movable carrier 10, and the filter 61 are packaged into an integrated structure to form a closed space, so that the photosensitive chip 63 is received in the closed space, improving the sealing property of the photosensitive chip 63 and ensuring that the imaging of the photosensitive chip 63 is not affected by dust during the manufacture or use of the camera module.

In some embodiments, the circuit is integrally molded in the fixed base 22 by the insert molding technique, and the fixed base 22 is electrically connected to the circuit board 62 to facilitate the conduction of the wires between the fixed base 22 and the first coil 31.

In some embodiments, at least two LDS slots are provided on the outer surface of the fixed base 22, and a conductive plating layer is plated on the surface of the LDS slots. The fixed base 22 is electrically connected to the circuit board 62 via the conductive plating layer of the LDS slots, so as to facilitate the conduction of the wires between the fixed base 22 and the first coil 31. The depth of the LDS slot is not more than 20-30 μm and the width is not less than 60 μm. LDS (laser direct forming technology) is employed in the slot, and a conductive coating (such as nickel palladium coating) is plated on the surface of the LDS slot, so that interference from other internal metals can be avoided and circuit conduction can be realized.

In some embodiments, the second coil 32 is electrically connected to a circuit board 62 of the photosensitive assembly 60, and extended upwardly via the circuit board 62 to conduct to the fixed base 22, which is electrically connected to the first coil 31 via the conductive extending portion 233b to realize the electrical connection structure of the camera module.

In some embodiments, the camera module further comprises a shell 50, the photosensitive chip driving device 2 and the photosensitive assembly 60 are received inside the shell 50, and the fixed base 22 is fixedly connected to the shell 50. The shell 50 comprises a first shell body 51 covering the carrier frame 20 from the front, and a second shell body 52 covering the photosensitive assembly 60 from the rear. The carrier frame 20 supports the movable carrier 10 to move along the orthogonal plane of the optical axis to prevent the imaging assembly from punching out and causing damage to the camera module when an external impact occurs. The fixed base 22 is fixed to the first shell body 51 and the second shell body 52.

The basic principles, main features, and advantages of the present disclosure are described above. Those skilled in the art will appreciate that the present disclosure is not limited by the above-described embodiments that only the principles of the present disclosure are described in the above-mentioned embodiments and the description, and that various variations and modifications can be made to the present disclosure without departing from the spirit and scope of the present disclosure, which fall within the scope of the claimed present disclosure. The scope of protection claimed by the present disclosure is defined by the appended claims and their equivalents.

What is claimed is:

1. A photosensitive chip driving device, adapted for a photosensitive assembly, comprising:
   a movable carrier for carrying the photosensitive assembly;
   a fixed base, wherein the fixed base and the movable carrier are disposed correspondingly at intervals along an optical axis direction;
   a driving apparatus comprising at least one group of coils and at least one group of magnets mounted on the peripheral side of the fixed base, and at least one group of coils being mounted on the peripheral side of the movable carrier;
   a guiding slot disposed between the movable carrier and the fixed base;
   a supporting apparatus movably disposed in the guiding slot; and
   a magnetic member mounted on the movable carrier and disposed corresponding to the magnets, so that a magnetic force along the optical axis direction is generated between the magnetic member and the magnets, wherein the supporting apparatus is clamped between the fixed base and the movable carrier.

2. The photosensitive chip driving device according to claim 1, wherein the at least one group of coils comprises at least a second coil, the second coil is mounted on the peripheral side of the movable carrier, the magnets and the second coil are axially disposed correspondingly, the second coil and the magnets form a second magnetic field loop to drive the movable carrier to move relative to the fixed base along the orthogonal plane of the optical axis and to correct the vibration of the photosensitive assembly, and the magnetic member is disposed in the photosensitive assembly with the movable carrier to drive the photosensitive assembly to reset along the orthogonal plane of the optical axis.

3. The photosensitive chip driving device according to claim 2, wherein the magnets and the second coil are axially disposed correspondingly, the magnetic member is located on a rear surface of the second coil, and the magnetic member and the second coil are axially fixed around the movable carrier correspondingly.

4. The photosensitive chip driving device according to claim 2, wherein the guiding slot comprises a plurality of tracks respectively disposed on the facing surfaces of the movable carrier and the fixed base, and each supporting apparatus is received in each of the tracks, so that the supporting apparatus rotatably supports the movable carrier to move radially along the orthogonal plane of the optical axis.

5. The photosensitive chip driving device according to claim 4, wherein the guiding slot is provided with a first track and a second track, the first track and the second track form a cross structure, and are respectively located at the intervals of the adjacent second coils, the first track is disposed on the upper surface of the movable carrier along the X direction, and the second track is relatively disposed on the lower surface of the fixed base along the Y direction, so that the supporting apparatus can move in the first track and the second track.

6. The photosensitive chip driving device according to claim 4, wherein the number of the supporting apparatus is at least three, the number of the tracks is at least three pairs, and the supporting apparatus is balls.

7. The photosensitive chip driving device according to claim 4, wherein the number of the tracks and the supporting apparatus are respectively four, the tracks are respectively recessed at four facing corners of the movable carrier and four facing corners of the fixed base, and the supporting apparatus rotatably supports on the four corners of the movable carrier.

8. The photosensitive chip driving device according to claim 5, wherein the cross-sectional structures of the first track and the second track are at least one of U-shaped, V-shaped and trapezoidal.

9. The photosensitive chip driving device according to claim 2, wherein an axial distance is formed between the second coil and the magnets, the axial distance being 0.05 to 0.5 mm.

10. The photosensitive chip driving device according to claim 2, wherein the magnetic member and the guiding slot are sequentially disposed at intervals on the orthogonal plane of the optical axis, the magnetic member is an iron sheet, the number of the magnets is four, the number of the second coils and the number of the magnetic members are equal with the number of the magnets, and the magnets are disposed along four peripheral sides of the fixed base.

11. The photosensitive chip driving device according to claim 2, further comprising a carrier frame, wherein the carrier frame comprises a lens carrier and the fixed base disposed on the outer periphery of the lens carrier, the lens assembly is received in the lens carrier, the at least one group of coils further comprises at least one first coil, the magnets and the first coil are radially disposed correspondingly, and the first coil and the magnets form a first magnetic field loop to drive the lens carrier to move along the optical axis direction, for automatic focusing.

12. The photosensitive chip driving device according to claim 11, wherein the fixed base is provided with a receiving cavity, a first opening, and a second opening, the receiving cavity is disposed around the fixed base, the first opening is disposed at the radial inner side of the receiving cavity, the second opening is disposed at the axial lower side of the receiving cavity, and the magnets is fixed in the receiving cavity.

13. The photosensitive chip driving device according to claim 11, wherein the carrier frame further comprises an elastic supporter elastically connected to the lens carrier and the fixed base, the elastic supporter supports the lens carrier to move and focus relative to the fixed base along the optical axis direction, and the elastic supporter comprises an upper elastic piece movably connecting the upper surface of the lens carrier and the fixed base, a lower elastic piece movably connecting the lower surface of the lens carrier and the fixed base, and at least one pair of extending portions electrically conducted to the fixed base and the elastic supporter so that the first coil is electrically connected to the fixed base.

14. The photosensitive chip driving device according to claim 11, wherein the extending portions are two, respectively fixed at the corners of the fixed base, each of the extending portions comprises a first fixed end, a second fixed end, and a suspended wire curvingly connecting the first fixed end and the second fixed end, and the first fixed end is fixed to the fixed base.

15. The photosensitive chip driving device according to claim 11, wherein the magnets comprise a first magnet and at least two second magnets, the first magnet is disposed on one side of the fixed base, the first magnet and the first coil are radially disposed correspondingly to drive the lens carrier to move along the optical axis, the second magnet is disposed on the other adjacent two sides of the fixed base, the second magnet and the second coil are axially disposed correspondingly to drive the movable carrier to move along the orthogonal plane of the optical axis.

16. The photosensitive chip driving device according to claim 11, wherein the driving distance of the diving apparatus for the lens carrier along the optical axis direction is ±250 μm, and the driving distance of the diving apparatus for the movable carrier along the orthogonal plane direction of the optical axis is ±150 μm.

17. A camera module, comprising:
a photosensitive chip driving device comprising:
  a movable carrier for carrying the photosensitive assembly;
  a fixed base, wherein the fixed base and the movable carrier are disposed correspondingly at intervals along an optical axis direction;
  a driving apparatus comprising at least one group of coils and at least one group of magnets mounted on the peripheral side of the fixed base, and at least one group of coils being mounted on the peripheral side of the movable carrier;
  a guiding slot disposed between the movable carrier and the fixed base;
  a supporting apparatus movably disposed in the guiding slot; and
  a magnetic member mounted on the movable carrier and disposed corresponding to the magnets, so that a magnetic force along the optical axis direction is generated between the magnetic member and the magnets, wherein the supporting apparatus is clamped between the fixed base and the movable carrier;
  a lens assembly provided with at least one lens and is disposed in the fixed base; and
  a photosensitive assembly capable of photosensitive imaging, and the photosensitive chip driving device is for driving the photosensitive assembly to be displaced along the orthogonal plane direction of the optical axis.

18. The camera module according to claim 17, wherein the photosensitive assembly comprises a filter, a circuit board, a photosensitive chip, and an electronic component, the coil is electrically connected to the circuit board, the photosensitive chip and the electronic component are electrically connected to the circuit board, the filter is attached inside the movable carrier, and the circuit board and the photosensitive chip are located at the rear of the movable carrier.

19. The camera module according to claim 18, wherein the circuit is integrally molded in the fixed base by embedded injection molding, and the fixed base is electrically connected to the circuit board.

20. The camera module according to claim 18, further comprising a shell, wherein the photosensitive chip driving device and the photosensitive assembly are received inside the shell, and the fixed base is fixedly connected to the shell.

* * * * *